US009854751B2

(12) United States Patent
Lefsrud et al.

(10) Patent No.: US 9,854,751 B2
(45) Date of Patent: Jan. 2, 2018

(54) GREENHOUSE AND METHOD FOR COOLING SAME

(71) Applicant: THE ROYAL INSTITUTION FOR THE ADVANCEMENT OF LEARNING/MCGILL UNIVERSITY, Montreal (CA)

(72) Inventors: Mark Lefsrud, Hudson (CA); Polina Fateeva, Ste-Anne-de-Bellevue (CA); Lucas McCartney, Valcartier (CA)

(73) Assignee: THE ROYAL INSTITUTION FOR THE ADVANCEMENT OF LEARNING/MCGILL UNIVERSITY, Montréal (CA)

( * ) Notice: Subject to any disclaimer, the term of this patent is extended or adjusted under 35 U.S.C. 154(b) by 81 days.

(21) Appl. No.: 14/574,634

(22) Filed: Dec. 18, 2014

(65) Prior Publication Data
US 2015/0173308 A1    Jun. 25, 2015

(30) Foreign Application Priority Data
Dec. 20, 2013   (CA) .................... 2838296

(51) Int. Cl.
*A01G 9/24*   (2006.01)
*A01G 9/14*   (2006.01)

(52) U.S. Cl.
CPC ............ *A01G 9/246* (2013.01); *A01G 9/14* (2013.01)

(58) Field of Classification Search
CPC ...... A01G 9/14; A01G 9/1415; A01G 9/1469; A01G 9/22; A01G 9/24; A01G 9/246; E04B 7/08; E04B 7/12; E04D 13/174

(Continued)

(56) References Cited

U.S. PATENT DOCUMENTS 3,028,872 A * 4/1962 Cresswell ............ A01G 9/1407
                                                          135/122
3,949,522 A    4/1976 Kehl et al.
(Continued)

FOREIGN PATENT DOCUMENTS

WO    9614733    5/1996
WO    0030431    6/2000
(Continued)

OTHER PUBLICATIONS

Teton&Grand Teton Zephyr Adaptors, Nexus Corporation, 2013, www.nexuscorp.com.
(Continued)

*Primary Examiner* — Lisa L Tsang
(74) *Attorney, Agent, or Firm* — Norton Rose Fulbright Canada LLP

(57) ABSTRACT

A greenhouse having side walls that provide a structural frame and which define an enclosed growing area. The greenhouse also has a roof which extends from the structural frame, and which has multiple roof sections extending inwardly over the growing area. A first roof section covers a first portion of the growing area and terminates in a first remote edge which is spaced inwardly from the structural frame. A second and subsequent roof sections covers the growing area and terminates in a second remote edge which overlaps the first remote edge, thus defining a vertical gap between the adjacent roof sections through which air can circulate. The greenhouse also has a cooling system mounted to a roof section which has nozzles for spraying water vapor into the circulating air, thus cooling the air.

18 Claims, 8 Drawing Sheets

(58) Field of Classification Search
USPC ..... 47/17, 19.1, 19.2, 20.1, 21.1, 22.1, 29.1, 47/29.5, 29.6; 52/198
See application file for complete search history.

(56) References Cited

U.S. PATENT DOCUMENTS

| | | | |
|---|---|---|---|
| 4,047,328 A | | 9/1977 | Kehl et al. |
| 4,068,423 A | | 1/1978 | Marsh |
| 4,312,157 A | * | 1/1982 | Hertel .................. A01G 9/242 52/13 |
| 4,815,365 A | * | 3/1989 | Dupont .................. F24F 7/02 454/254 |
| 4,901,499 A | * | 2/1990 | Mairlot ............... A01G 9/1476 29/446 |
| 4,915,022 A | * | 4/1990 | Lynch .................. A01G 9/242 454/364 |
| 4,945,821 A | * | 8/1990 | Holmberg ................ F24F 7/02 454/250 |
| 4,955,287 A | * | 9/1990 | Dupont .................. F24F 7/02 454/358 |
| 5,212,903 A | * | 5/1993 | Talbott ................. A01G 9/242 239/242 |
| 5,709,049 A | * | 1/1998 | Baird ................. A01G 13/0281 47/21.1 |
| 6,185,877 B1 | * | 2/2001 | Lloyd .................... A01G 9/16 47/19.1 |
| 7,322,154 B2 | * | 1/2008 | Forbis, Sr. ............. E04D 13/00 160/371 |
| 7,963,295 B2 | * | 6/2011 | Li ........................ E04H 15/16 135/120.2 |
| 2004/0049976 A1 | | 3/2004 | Maffei |
| 2005/0268544 A1 | | 12/2005 | Maffei |
| 2012/0132375 A1 | * | 5/2012 | Huang .................. A01G 9/241 160/104 |

FOREIGN PATENT DOCUMENTS

| | | |
|---|---|---|
| WO | 02052112 | 7/2002 |
| WO | 2004016875 | 2/2004 |
| WO | 2006032077 | 3/2006 |
| WO | 2009117801 | 10/2009 |
| WO | 2012138159 | 10/2012 |
| WO | 2012138160 | 10/2012 |
| WO | 2012138162 | 10/2012 |

OTHER PUBLICATIONS

Zephyr Brochure, Nexus Greenhouse Systems, 2013, www.nexuscorp.com.

* cited by examiner

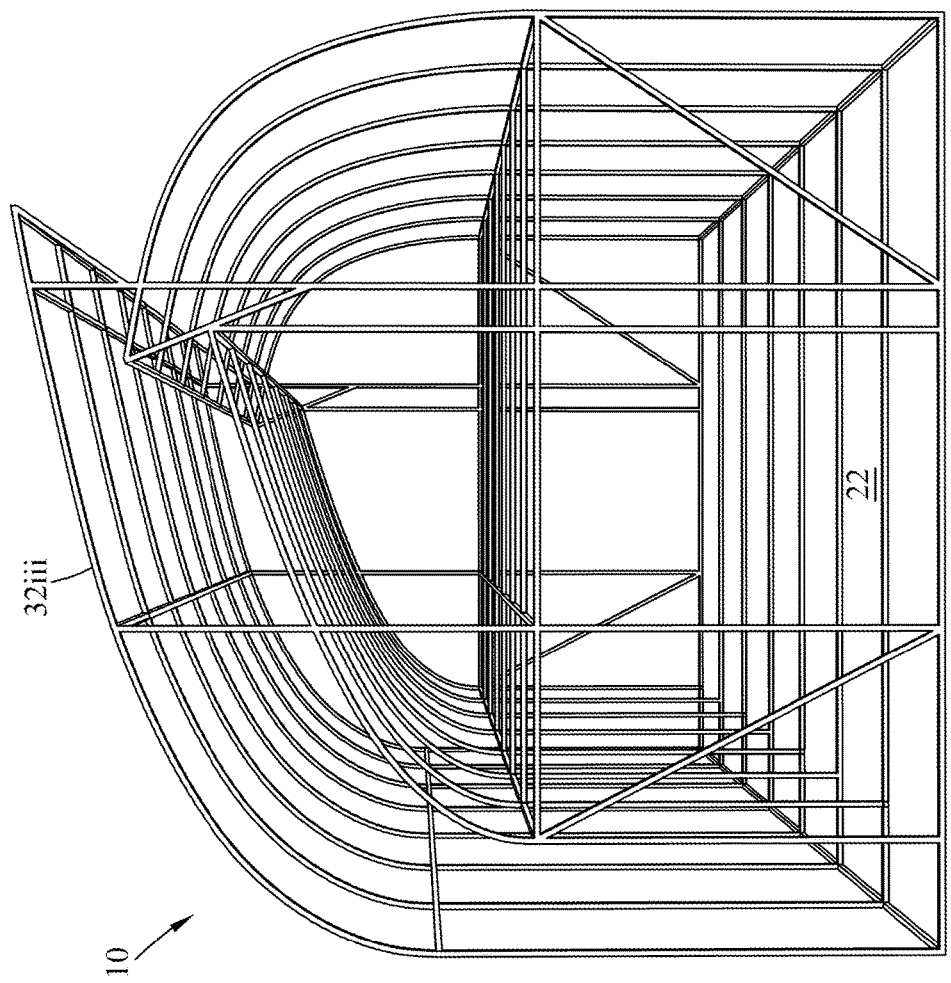

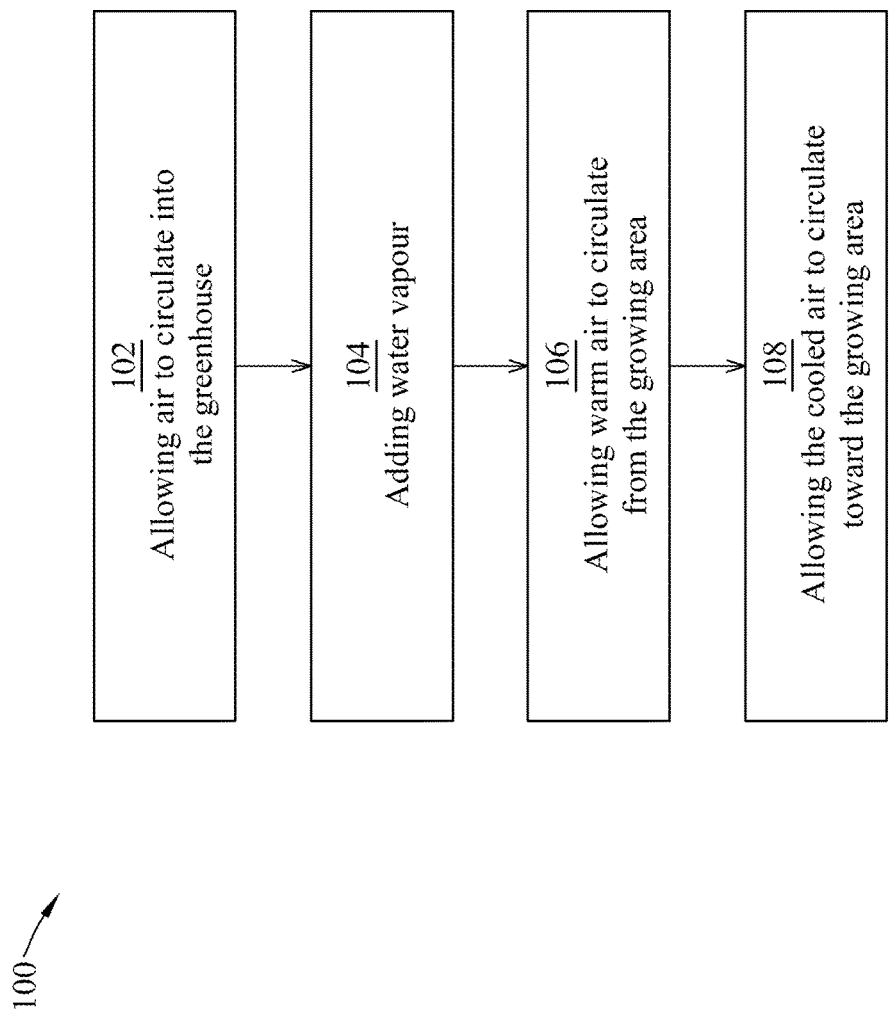

GREENHOUSE AND METHOD FOR COOLING SAME

CROSS-REFERENCE TO RELATED APPLICATIONS

The present application claims priority on Canadian patent application number 2,838,296 filed Dec. 20, 2013, the entire content of which is incorporated herein by reference.

TECHNICAL FIELD

The present invention relates generally to greenhouses and methods for cooling a greenhouse.

BACKGROUND

Challenges with growing crops in tropical regions include high heat, humidity, and precipitation. Due to the sensitivity of germination and sprout growth, these undesirable environmental characteristics make agricultural production difficult, expensive, and energy consuming. Therefore, the use of greenhouses in such climates can be beneficial because they allow control of the climate inside the greenhouse, and thus help to provide optimal growing conditions.

Controlling ventilation within the greenhouse can assist in temperature control, in the prevention of plant pathogens, and can also provide fresh air for photosynthesis and respiration. Furthermore, having control of the growing environment in an enclosed structure reduces the need for chemicals and pesticides for pest control.

Greenhouses in tropical climates are known to use a forced air ventilation system which uses a fan to circulate air and decrease temperature. However, such systems are energy intensive, and thus typically beyond the resources of many potential users of greenhouses. Furthermore, such systems can be prone to failure or damage when faced with disturbances like tropical storms.

Accordingly, there exists a need for an improved greenhouse and method for cooling same.

SUMMARY OF THE INVENTION

In accordance with an aspect of the present invention, there is provided a greenhouse comprising: one or more upstanding side walls providing a structural frame forming a periphery of the greenhouse and providing structural support for the greenhouse, the side walls defining an enclosed growing area within the greenhouse, each side wall comprising a top edge; a roof extending upward from the structural frame and covering the growing area, the roof having two or more roof sections each extending inwardly from the structural frame and terminating over a portion of the growing area, the roof sections comprising: a first roof section extending from a lower inward edge spaced laterally inwardly from the structural frame and terminating in a first remote edge disposed over the growing area; at least a second roof section terminating in a second remote edge disposed over the growing area; the second remote edge overlapping the first remote edge such as to define a roof overlap between the first and the second roof sections, the first and second roof sections being spaced apart to define a vertical gap between the first and second roof sections at said roof overlap, the vertical gap forming a first air flow opening permitting air circulation therethrough, a second air flow opening defined between the lower inward edge of the first roof section and at least one of the second roof section and the structural frame, a continuous air flow channel being formed between the first and second roof sections and extending between the first and second air flow openings to permit air circulation therebetween; and a cooling system mounted to at least one of the first and second roof sections and including nozzles operable to spray water vapour into the air circulating within the air flow channel defined between the first and second roof sections.

In accordance with another aspect of the present invention, there is provided a greenhouse as defined in the paragraph above, wherein the greenhouse comprises three roof sections, wherein: the first roof section extends from the inward edge spaced inwardly from a first side wall and terminates in the first remote edge disposed over the growing area; a middle roof section extends inwardly from the top edge of a second side wall opposed to the first side wall, and terminates in the second remote edge spaced inwardly from the second side wall, the first and second remote edges overlapping one another such as to define a first roof overlap between the first and the middle roof sections, a first vertical gap being defined between the first and middle roof sections at the first roof overlap to define a lower air flow opening permitting air circulation therethrough; and a third roof section extends inwardly from the top edge of the first side wall and terminates in a third remote edge spaced inwardly from the first side wall, the third and second remote edges overlapping one another such as to define a second roof overlap between the third and the middle roof sections, a second vertical gap being defined between the third and middle roof sections at the second roof overlap to define an upper air flow opening permitting air circulation therethrough, a side air flow opening defined between the inward edge of the first roof section and the third roof section, the continuous air flow channel being formed between the first and third roof sections permitting air circulation between the upper air flow opening and the side air flow opening.

There is further provided, in accordance with another aspect of the present invention, a method for cooling a greenhouse comprising a roof having two or more roof sections, each roof section extending inwardly from a structural frame defined by upstanding side walls to at least partially cover a growing area of the greenhouse, at least one roof section vertically overlapping another roof section such as to define a roof overlap between said roof sections, a continuous air flow channel being defined between said roof sections along said roof overlap, the air flow channel having an upper air flow opening permitting air circulation into and out of the greenhouse and a side air flow opening permitting air circulation into and out of the growing area, the method comprising the steps of: allowing air to circulate into the greenhouse via the upper air flow opening; adding water vapour to the air circulating within the air flow channel between at said roof sections, thereby cooling the air; allowing rising warm air to circulate from the growing area and out of the greenhouse through the upper air flow opening; and allowing the cooled air to circulate downward toward the growing area through the side air flow opening, thereby cooling the greenhouse.

BRIEF DESCRIPTION OF THE DRAWINGS

Reference will now be made to the accompanying drawings, showing by way of illustration various embodiments of the present invention and in which:

FIG. 6 is an end view of a greenhouse, according to yet another embodiment of the present disclosure;

FIG. 9 is a flow diagram of a method for cooling a greenhouse, according to yet another embodiment of the present disclosure.

DETAILED DESCRIPTION

Figure 1:
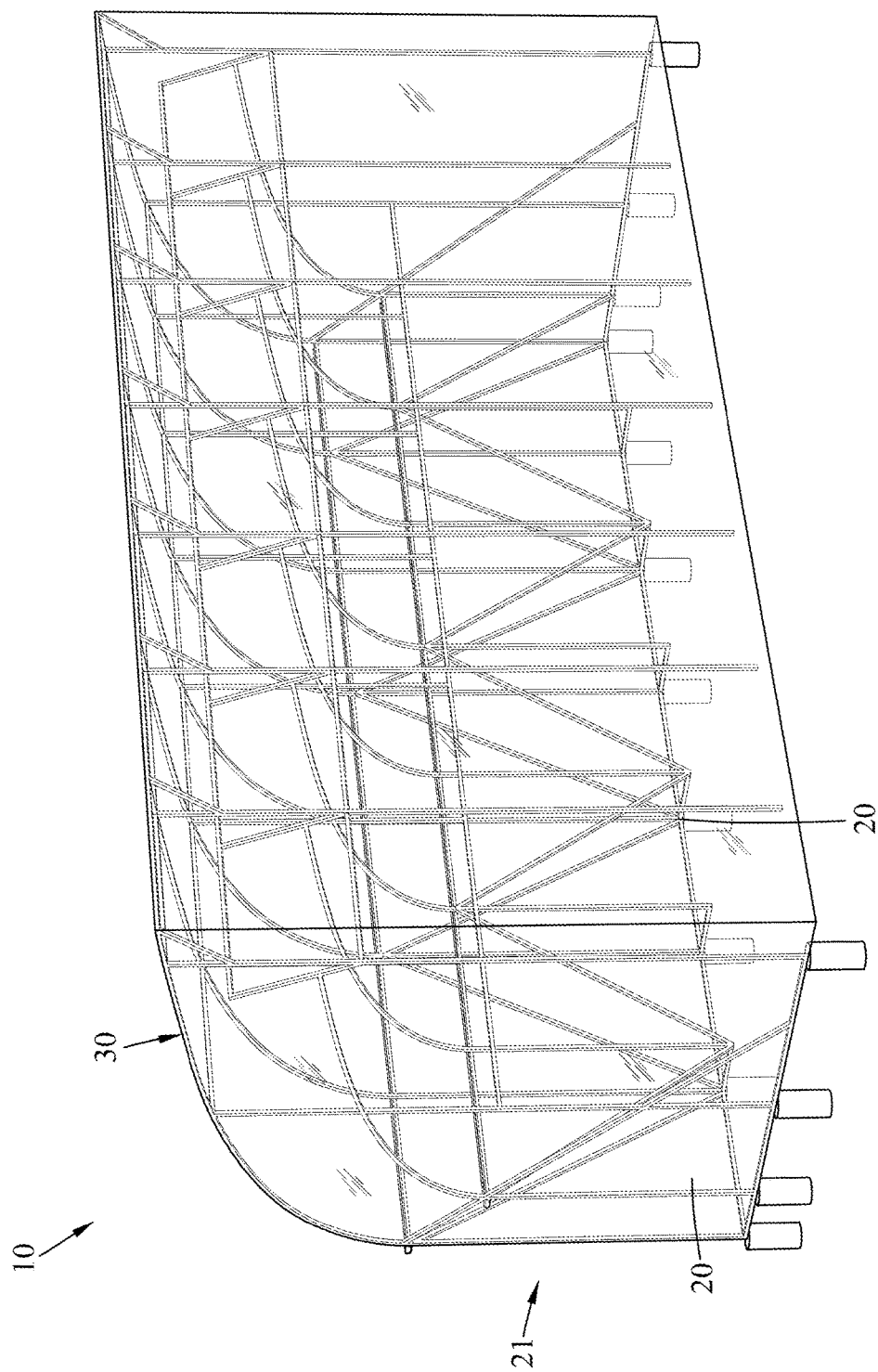
FIG. 1 is a perspective view of a greenhouse, according to one embodiment of the present disclosure.

FIG. 1 shows an embodiment of a greenhouse 10 of the present disclosure. The greenhouse 10 can be any building with substantially light-transmitting walls and a roof which allow sunlight to pass therethrough in order to encourage the cultivation of plants within the greenhouse. In most embodiments, the greenhouse 10 can rest upon the ground or a constructed foundation so as to be more stably grounded. Although described herein as being suitable for tropical climates, it will be appreciated that the greenhouse 10 can be used in temperate, northern, or other climates where it is desired to control at least one of the temperature and the humidity within the greenhouse 10.

The greenhouse 10 facilitates control of the microclimate created therein by providing improved regulation of the temperature and humidity within the greenhouse 10. As will be further discussed below, this is achieved by using the natural circulation of air within the greenhouse 10, and by complementing this natural circulation by cooling the air entering the greenhouse 10. The greenhouse 10 can therefore be designated a "natural ventilation augmented cooling" greenhouse, or a NVAC greenhouse.

The natural ventilation in the greenhouse 10 arises from pressure differences between the interior of the greenhouse 10 and the air surrounding the exterior of the greenhouse 10. These pressure differences are created by temperature and wind speed changes in the vicinity of the greenhouse 10. Natural ventilation is a "passive" technique for cooling the greenhouse 10, and is thus a cost effective method of cooling in comparison with active systems requiring electrically operated fans. However, many factors can affect the rate of natural ventilation. When these factors do not allow for suitable cooling, or at any time, the greenhouse 10 can complement the natural ventilation effect with augmented cooling.

One possible technique for augmenting cooling involves evaporative cooling. As will be explained in more detail below, evaporative cooling can include adding a fog or mist of water vapour into the air entering the greenhouse 10. Such a technique helps to lower the temperature of the air within the greenhouse 10 and also helps maintain control of the humidity.

Components and features of the greenhouse 10 will now be described in reference to the figures.

Figure 2:
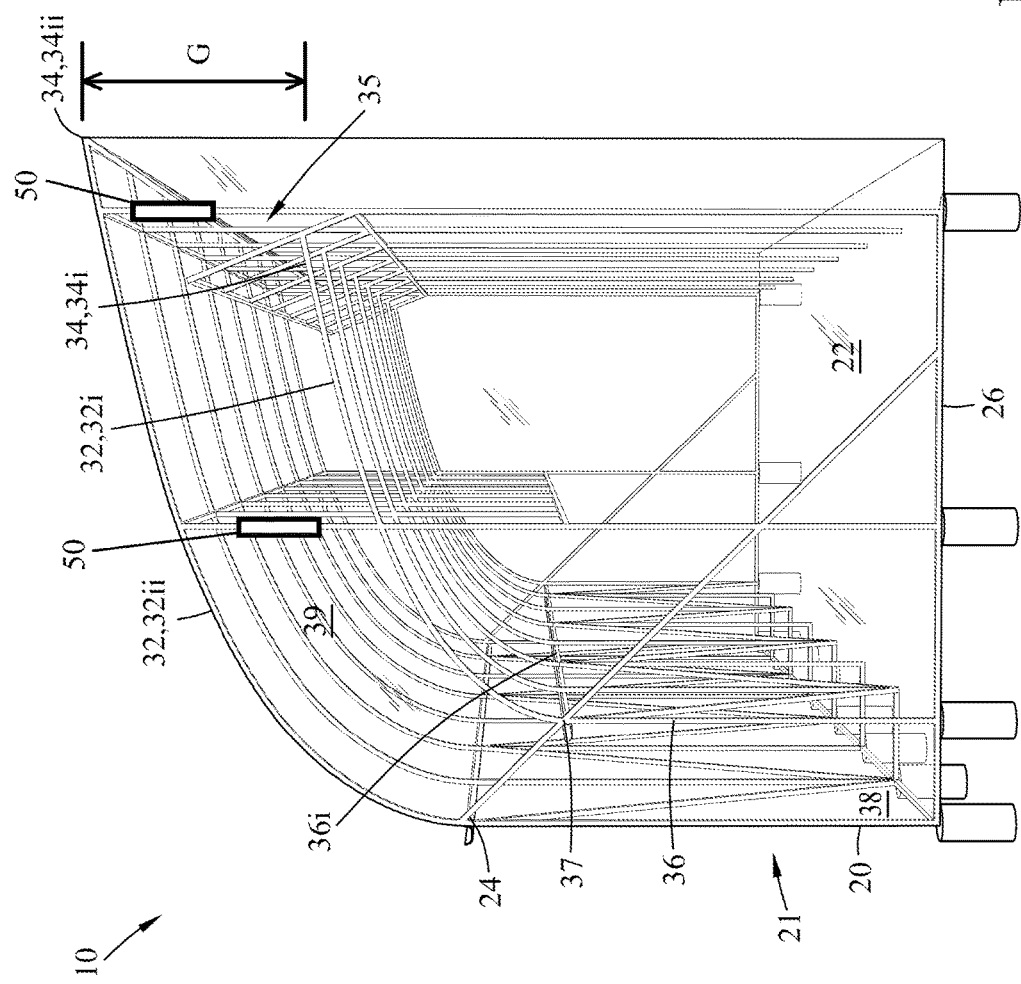
FIG. 2 is an end view of the greenhouse of FIG. 1.

Referring to FIGS. 1 and 2, the greenhouse 10 has multiple upstanding side walls 20. The side walls 20 are connected to one another such that they provide a structural frame 21 which supports the greenhouse 10 and the loads generated during its operation. The structural support provided by the structural frame 21 can be complemented by a suitable foundation, if so desired. The structural frame 21 and side walls 20 form a periphery delineating the contours of the greenhouse 10. The side walls 20 further define an enclosed space in which cultivation can occur, which is referred to herein as a growing area 22. In the embodiment shown in FIGS. 1 and 2, the side walls 20 of the greenhouse 10 form a rectangular shape and therefore define a substantially rectangular growing area 22 therewithin. However, the side walls 20 can define a growing area 22 of any suitable shape (i.e. circular, elliptical, triangular, etc.). It can thus be appreciated that the number of side walls 20, and their orientation and relationship with one another, can vary depending upon the shape of the greenhouse 10, amongst other factors. The growing area 22 corresponds to any expanse within the greenhouse 10 on which plant cultivation occurs. In the embodiment shown in FIGS. 1 and 2, the growing area 22 is the interior floor portion of the greenhouse 10.

The side walls 20 may themselves contribute to the natural ventilation provided by the greenhouse 10. This can be achieved by providing one or more side walls 20 with a screened wall which extends along all or a portion of the length of the side wall 20, and along some or all of its height. Such a meshed or screened wall may advantageously allow for cross-flow between opposed side walls 20, and still allow for the desired natural ventilation discussed below. Thus, screened side walls 20 can further contribute to aeration in the greenhouse 10. It may also be suitable to treat one or more of the side walls 20, or roof sections, with an insect repellent.

Each side wall 20 has a top edge 24 and a bottom edge 26. The top edge 24 of each side wall 20 corresponds to the portion of the side wall 20 furthest away from the ground surface, and extends along the length of the side wall 20. Each top edge 24 can have a height that varies along its length, as is the case with a top edge 24 that slopes vertically along its length. Further, in at least one possible embodiment, the height of a top edge 24 for a given side wall 20 is different than the height of a top edge 24 for another side wall 20. An example of this is provided in FIG. 3, where top edge 24i has a greater height than the top edge 24ii of the opposite side wall 20. Similarly, the bottom edge 26 of each side wall 20 corresponds to the portion of the side wall 20 closest to the ground surface, and extends along the length of the side wall 20.

Still referring to FIGS. 1 and 2, the greenhouse 10 also has a roof 30 which is attached to, and extends upward from, the structural frame 21. The roof 30 covers the growing area 22. The roof 30 can be made of any suitable transparent or light-transmitting surface so that sunlight penetrates to the growing area 22. One such surface can be created with a water-impermeable membrane, such as plastic sheeting. This sheeting can also be perforated if additional ventilation is desired.

The roof 30 has at least two roof sections 32. Together, the roof sections 32 make up the roof 30 and define the covering it provides to the growing area 22. As will be discussed in more detail below, the relative position and configuration of the roof sections 32 also facilitate the natural ventilation of the greenhouse 10 while still advantageously shielding the greenhouse 10 from pests and the elements.

Each roof section 32 extends inwardly from the structural frame 21 such that it extends toward, and over, the growing area 22. Although the embodiments of the figures show two or three roof sections 32, it will be appreciated that more than three roof sections 32 are also within the scope of the present disclosure.

The roof sections 32 can be constructed appropriately to provide the functionality ascribed to them herein, and to meet other structural requirements. For example, each roof section can have multiple frame members which are spaced adjacent to one another along the length of the side wall 20 or structural frame 21 from which the roof section 32 extends These frame members can follow the path of the roof section 32, and extend from the corresponding side wall 20 or structural frame 21 to its corresponding remote edge discussed below. The frame members can also be covered with a suitable water-impermeable membrane, such as plastic or glass sheeting.

Referring now to FIG. 2, the roof 30 having the roof sections 32 includes at least a first roof section 32*i* and a second roof section 32*ii*, as will be seen.

The first roof section 32*i* is generally the one closest in elevational position to the growing area 22 (i.e. having the lowest height), and provides a first partial coverage thereof. The first roof section 32*i* extends from a lower, inward edge 37, adjacent to or mounted to the structural frame 21, until it terminates at a first remote edge 34*i*.

The inward edge 37 is spaced laterally inwardly from a side wall 20, however the first roof section 32*i* is nevertheless supported by the structural frame 21. The spacing of the inward edge 37 from the side wall 20 or structural frame 21 allows for a first gap to be created between the first roof section 32*i* and the side wall 20, which will be discussed later.

In an alternative embodiment, the structural frame 21 can have a support member 36 placed inside the greenhouse 10 and spaced inwardly from a side wall 20. The support member 36 can include a plurality of posts, trusses, an internal wall, or other similar bearing members that allows air to circulate therethrough. The support member 36 can also have a support member top edge 36*i*, and the first roof section 32*i* can extend from the support member top edge 36*i*. The support member 36 extends along some or all of the length of its nearest adjacent side wall 20, and is generally oriented parallel to this side wall 20. The support member 36 provides a lateral gap or spacing 38 between its nearest side wall 20, as better shown in FIG. 2. This spacing 38 can advantageously be used to improve the natural ventilation of the greenhouse, or to collect and recycle water entering the greenhouse 10 and being channeled by an upper surface of the first roof section 32*i*. The spacing 38 can thus serve as a conditioning space where the air cooled by the cooling system undergoes changes in relative humidity, and thus contribute to the resulting quality of the cooled air being channeled into the growing area 22.

Although the extension of the first roof section 32*i* can begin at different points, the first roof section 32*l* terminates at the first remote edge 34*i*. The first remote edge 34*i* is the peripheral, outermost edge of the first roof section 32*i* and extends along the entire length of the first roof section 32*i*. Since the first roof section 32*i* covers some or all of the growing area 22, the first remote edge 34*i* is spaced inwardly from the position from which the first roof section 32*i* extends.

The roof 30 also has at least one more roof section 32, referred to now as a second roof section 32*ii*. The second roof section 32*ii* is generally disposed at a higher elevational position than the first roof section 32*i*, and is thus further away from the growing area 22 than the first roof section 32*i* (i.e. the second roof section 32*ii* has a greater height than the first roof section 32*i*). The second roof section 32*ii* also provides coverage to the growing area 22, and covers at least a portion of the growing area 22 that is already covered or not by the first roof section 32*i*. The second roof section 32*ii* extends from the top edge 24 of one of the side walls 20 of the greenhouse 10 until it terminates at a second remote edge 34*ii*.

The extension of the roof sections 32 from the structural frame 21 to the remote edges 34 can take many forms. In one embodiment, and as shown in FIG. 2, each of the roof sections 32 are arcuately shaped and thus extend inwardly as an arc spanning from their corresponding point or origin to their corresponding remote edge 20. The degree or radius of curvature of each of the arcuate roof sections 32 may vary, and may also be adjusted by using one or more adjustment devices or mechanisms 50. Such a roof 20 comprised of a number of overlapping arched roof sections 32 may provide any one of following advantageous: it may encourage better ventilation between adjacent arched roof sections 32, it may better channel and collect moisture on the upper surface of one of the arched roof sections 32, it may better resist the loads generated by heavy winds impacting the greenhouse 10, and it may be more visually appealing. It is appreciated that the roof sections 32 are not limited to arched extensions, and that other possible shapes are within the scope of the present disclosure.

It can be seen that the roof sections 32 at least partially overlap one another. This overlapping of the roof sections 32 can advantageously improve natural ventilation, and can also ensure that all portions of the growing area 22 of the greenhouse 20 are covered and protected from the elements. The overlapping roof sections 32 also help to ensure that any rain impacting the roof 30 is channeled away from the growing area 22.

The roof sections 32 can completely or only partially overlap, such as at their remote edges 34. As can be seen in FIG. 2, the second roof section 32*ii* and the second remote edge 34*ii* overlaps the first roof section 32*i* and the first remote edge 34*ii*. By "overlap", it is understood that a given roof section 32 or remote edge 34 extends above a lower roof section 32 or remote edge 34, and covers a portion of the growing area 22.

The overlapping remote edges 34*ii*,34*i* define a roof overlap between the vertically spaced apart roof sections 32*ii*,32*i*. A substantially vertical air gap G, defined between the overlapping portions of the roof sections 32*ii*,32*i* at the overlap point, extends between the vertically adjacent yet spaced apart roof sections 32. The vertical gap G can vary along the length of the greenhouse 10, or indeed between adjacent pairs of roof sections 32. The vertical G defines the boundaries and contour of an air flow opening 35 which allows for air to circulate to/from the greenhouse 10, and in/out of the roof sections 32. For example, such an exchange of air can involve warm air being expelled from within the greenhouse 10 and out the air opening, and can also involve cool air entering through the air opening and descending into the greenhouse 10.

Figure 3:
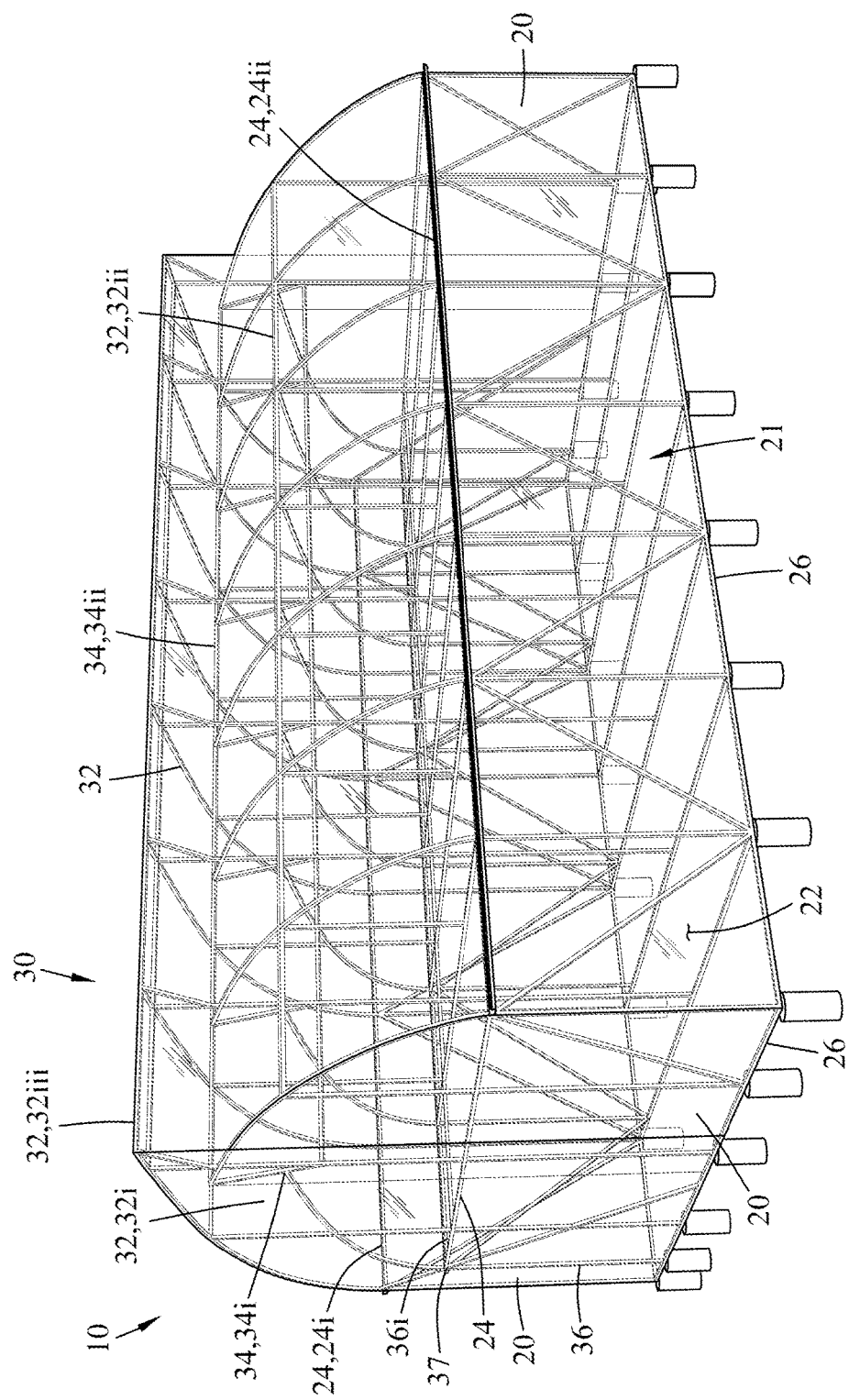
FIG. 3 is a perspective view of a greenhouse, according to another embodiment of the present disclosure.
Figure 4:
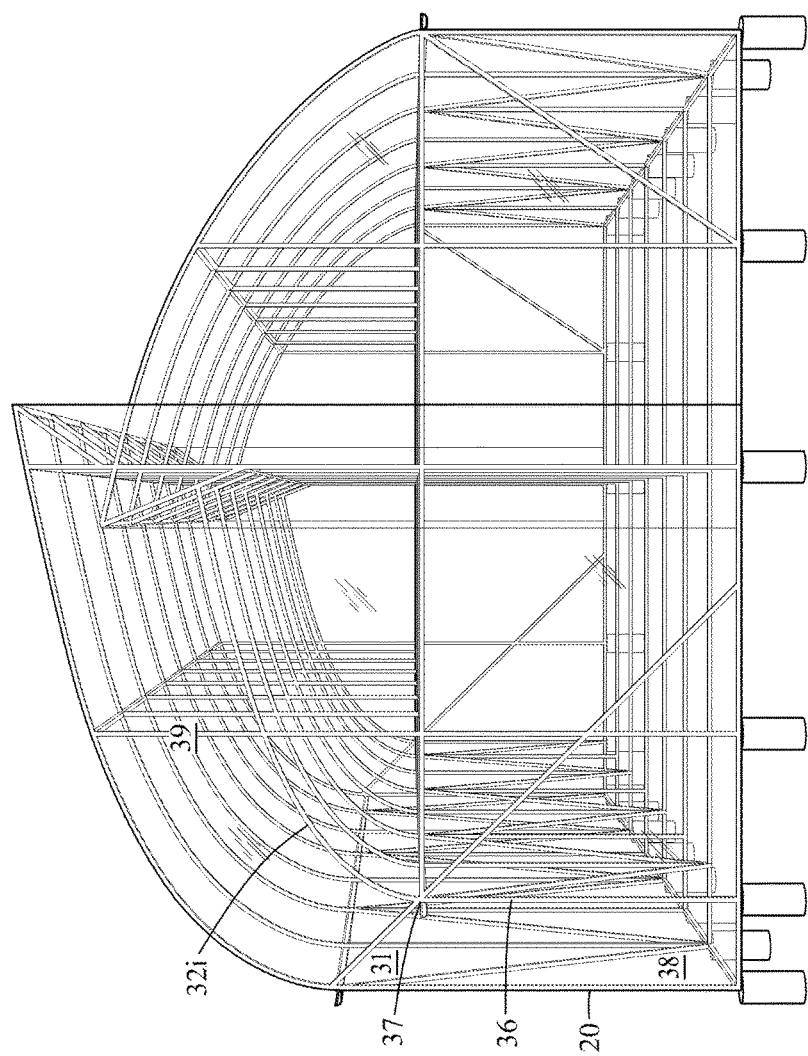
FIG. 4 is an end view of the greenhouse of FIG. 3.
Figure 5:
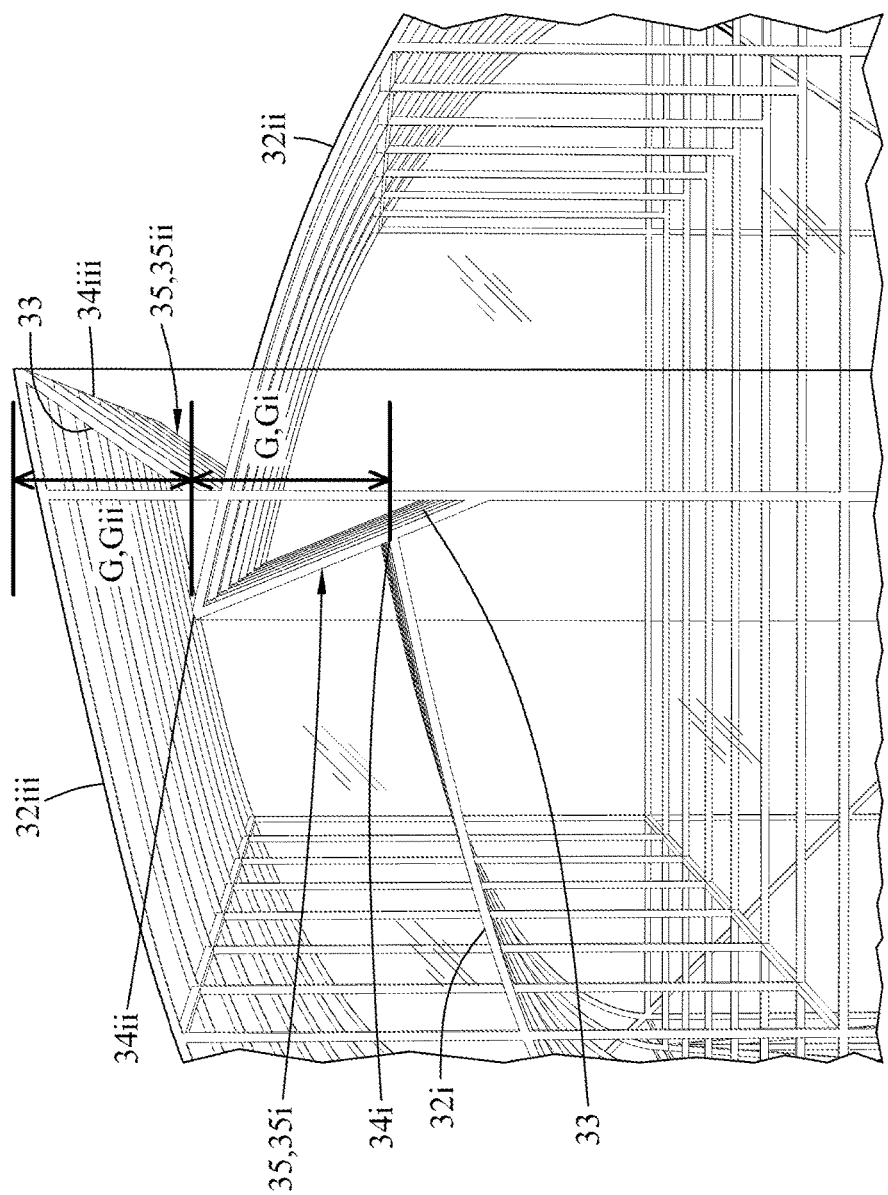
FIG. 5 is an enlarged perspective view of overlapping roof remote edges of the greenhouse shown in FIG. 4.

With reference to FIGS. 3 to 5, an embodiment of the greenhouse 10 having a roof 30 with three roof sections 32 will now be described. The first roof section 32*i* is as described above.

A middle roof section 32*ii* extends inwardly from the top edge 24 of a second side wall 20 opposed to the side wall nearest the inward edge 37 of first roof section 32. The second roof section 32*ii* terminates in the second remote edge 34*ii* spaced inwardly from the second side wall. The first and second remote edges 34*i*,34*ii* overlap one another and define a first roof overlap between the first and the middle roof sections 32*i*,32*ii*. A first vertical gap Gi is defined between the first and middle roof sections 32*i*,32*ii* at the first roof overlap to define a lower air flow opening 35*i* permitting air circulation therethrough.

A third roof section 32*iii* extends inwardly from the top edge 26 of the same side wall 20 adjacent to the inward edge 37 of the first roof section 32*i*, and terminates in a third remote edge 34*iii* spaced inwardly from this side wall 20. The third and second remote edges 34*iii*,34*ii* overlap and define a second roof overlap between the third and the second roof sections 32*iii*,32*ii*. The second roof overlap also has a second vertical gap Gii between the third and second roof sections 32*iii*,32*ii*, and defines an upper air flow opening 35*ii* permitting air circulation into and out of the greenhouse 10. A side air flow opening 31 is also defined between the inward edge 37 of the first roof section 32*i* and the third roof section 32*iii*. A continuous air flow channel 39 is thus formed between the first and third roof sections 32*i*,32*iii*, which allows air circulation between the upper air flow opening 35*ii* and the side air flow opening 31.

In this embodiment, the three roof sections 32*i*,32*ii*,32*iii* can be arched as explained above. Where the third roof section 32*iii* is arched, it may extend over the growing area 22 so as to cover substantially two thirds of the width of the greenhouse 10, as shown in FIG. 6. This disposition of the third roof section 32*iii* can expand the space 38, and thus help to reduce the presence of stagnant air on that side of the greenhouse 10. Furthermore, in this embodiment, the first roof section 32*i* can extend from the support member 36 discussed above.

Returning to FIGS. 3 to 5, the air flow openings 35*i*,35*ii* and/or the roof overlaps can be covered and/or closed, when required. The purpose behind such coverage can vary. For example, it may desirable to prevent pests such as insects and birds from entering the greenhouse 10. In such a situation, the upper air flow opening 35*ii* can have a screened gate 33 spanning its corresponding length between the remote edges 34 of adjacent roof sections 32. In one particular embodiment, the screened gate 33 is mounted to one of the remote edges 34 such that it can assist in collapsing a roof section 32 onto a lower roof section 32. This functionality can advantageously allow a grower using the greenhouse 10 to lower or reduce the vertical profile of the greenhouse 10 in preparation for a storm or heavy winds, and thus reduce the possibility of damage being done to the greenhouse 10 by a storm or heavy winds.

Figure 7:
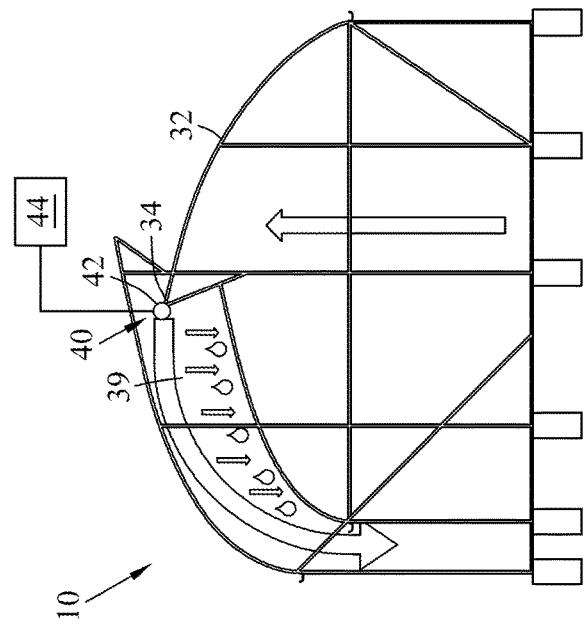
FIG. 7 is a schematic showing a cooling system of a greenhouse, according to yet another embodiment of the present disclosure.

The greenhouse 10 also has a cooling system 40, an example of which is shown schematically in FIG. 7. As previously explained, the cooling system 40 augments the cooling effect provided by the natural ventilation, thus contributing to the overall climate controlled provided by the NVAC greenhouse 10.

The cooling system 40 is mounted to one of the roof sections 32. The cooling system 40 has multiple nozzles 42 which are connected to a water source and are operable to spray water vapour into the air which circulates through the continuous air flow channel 39 discussed above. In so doing, the droplets of the water vapour or mist evaporate in the presence of the warm circulating air, which lowers the temperature of circulating air. Typically, in tropical climates, this type of evaporative cooling would result in drenching the air mass, as well as the plants of the growing area, while still only providing stagnant air. However, in combination with the structural features of the greenhouse 10 discussed above, and as will be further explained below, such evaporative cooling can complement and add to the cooling provided by the natural ventilation of the greenhouse 10.

The mounting of the cooling system 40 and/or nozzles 42 to one or more of the roof sections 32 can take different forms. One exemplary mounting can include an outdoor cooling 9.5 mm pipe misting system from Orbit® Irrigation Products Inc. The pipe can be installed along the second remote edge 34*ii* of the second roof section 32*ii* using suitable hose clamps. The nozzles 42 can consist of Brass Slip Lok Tees, and can be positioned uniformly to spray water down the space 38. Eight nozzles 42 can be installed at a 0.762 m interval from one another. Each nozzle 42 can have a capacity of 1.89 L per hour. Standard line pressures can be utilized.

In one possible configuration, the nozzles 42 are supplied by a pressurized water supply such that they can spray the water vapour as a fog or a fine mist. As shown schematically in FIG. 7, each of the nozzles 42 are mounted to a remote edge 34 of a roof section 32, and spaced apart from each other along the length of the remote edge 34. For example, the nozzles 42 can be mounted to the second remote edge 34*ii* so as to spray the water vapour into continuous air flow channel 39 between the first and third roof sections 32*i*,32*iii*. In such a configuration, the water vapour that does not evaporate is advantageously prevented from falling toward the growing area and drenching the plants cultivating therein because it is diverted by the upper surface of the first roof section 32*i* toward the space 38, where it can be reused or disposed of. Furthermore, having the line of nozzles 42 in such a configuration can allow the rising warm air from the growing area 22 to intercept incoming fresh air from the upper air flow opening 35*ii*, thus closing the cyclic air movement at this specific point in the greenhouse 10.

It will be appreciated that many nozzle 42 mounting configurations are within the scope of the present disclosure, provided that the nozzles 42 extend along a length parallel to the length of the greenhouse 10 and direct the water vapour downward.

The cooling system 40 can also have a relay 44, which can be any automated device that controls the supply of water vapour from the nozzles. The relay 44 can be operatively connected to the nozzles 42 so that they spray the water vapour only when required, such as at intermittent, regular or irregular, time intervals. The determination of the time intervals can depend on the parameters of the greenhouse 10 and the surrounding environment, and can be eliminated when no longer required such as at night. This information can be fed to the relay via sensors placed on roof sections 32, on side walls 20, in the growing area 22, outside the greenhouse 10, and in any other suitable location. The following is a non-exhaustive list of parameters that can be used to adjust the flow and time interval of the nozzles 42: ambient air temperature, air temperature of the greenhouse 10, relative humidity of the greenhouse 10, solar radiation, supplemental radiation, vapor pressure in the greenhouse 10, and wind speed.

Figure 8:
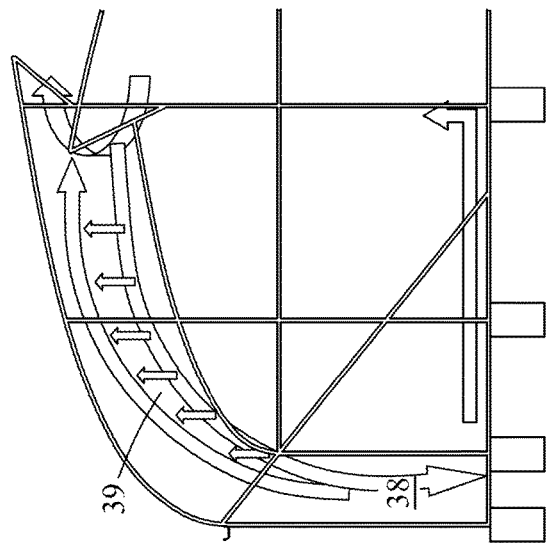
FIG. 8 is a schematic showing the circulation of warm and cooled air through a greenhouse, according to yet another embodiment of the present disclosure.

Having described at least some of the components and features of the greenhouse 10, reference is now made to FIG. 8, which provides a schematic showing how air might circulate within an embodiment of the greenhouse 10 during use.

As the nozzles 42 spray water vapour into the continuous air flow channel 39, there may be an exchange in humidity between two masses of air in the space 38, represented by warmer air mass 1 and cooler air mass 4. The misting of the warm air may cause some of the newly humid air mass 1 to further rise in the space 38. This warm humid air mass 1 can mix with the warm rising air mass 2 from the interior of the greenhouse 10 circulating through the lower air flow opening 35i, and this mixing may allow both air masses 1,2 to escape from the upper air flow opening 35ii and out of the greenhouse 10. The more dense cooler air mass 4 can descend through the air flow channel 39 along the upper surface of the first roof section 32i and into the space 38 as a result of the misting, while dumping humidity along the way into the air mass 1 rising above it. The cooler air mass 4 eventually leaks into the growing area 22 via the support member 36 as air mass 3, which cools the growing area 22 and thus the greenhouse 10.

It can thus be appreciated that a cyclical movement of air can be created by the downward flow of air through the air flow channel 39 and into the space 38. Air can be forced to collapse onto and roll down the upper surface of the roof section 32i and then spread into the growing area 22. Air can then rise from the growing area 22 due to natural convection and eventually reached the uppermost area where the roof sections 32 come together, and the process is repeated. This cyclical movement of air can be facilitated by roof section 32i, amongst other factors. Indeed, roof section 32i can help to channel the downward moving, cooled air from the cooling system 40. Roof section 32i can thus give direction to the air in the greenhouse 30, which in turn helps to provide the natural ventilation.

It can thus be appreciated that the NVAC greenhouse 10 advantageously can allow a passive, low energy, conditioning system within the greenhouse 10, in that it helps to reduce air temperature and helps to maintain or reduce the relative humidity of the greenhouse 10.

According to another general aspect, and referring to FIG. 9, a method 100 for cooling a greenhouse 10 is provided. The greenhouse 10 has a similar structure to the one described above.

The method includes the step 102 of allowing air to circulate into the greenhouse 10 via the upper air flow opening 35ii between adjacent roof sections 32. The term "allowing" refers to the passive nature of such air circulation, in that the grower or user need only supply the structure of the greenhouse 10 so as to facilitate such air circulation.

The method also includes step 104, which involves adding water vapour to the air circulating between one or more vertically adjacent pairs of roof sections 32 in the air flow channel 39 so as to cool the circulating air. The adding of water vapour can include spraying the water vapour under pressure, such as by using the nozzles 42 described above. The water vapour can also be added from one or more remote edges 34 of one or more roof sections 32. The water vapour can also be added at intermittent time intervals depending on some or all of the parameters discussed above.

The method includes the step 106, which involves allowing rising warm air to circulate from the growing area 22 and out of the greenhouse 10 through at least of the lower and the upper air flow opening 35i,35ii.

The method also includes step 108, which involves allowing the cooled air to circulate downward toward the growing area 22 through the side air flow opening 31, thereby cooling the greenhouse 10. The meaning of "allowing" in steps 106 and 108 has the same meaning as in step 102.

The method can also include some optional steps. One such step involves adjusting the curvature of one or more roof sections 32, which may be pertinent in the embodiment where they are arched. Another such step involves collapsing or otherwise closing one roof section 32 onto a lower roof section 32, such as to thereby close the air flow opening therebetween, which may be desirable if the passive air circulation is to be limited and/or or stopped, or if the vertical profile of the greenhouse 10 needs to be reduced in preparation for a storm. Yet another such step involves preventing the ingress of birds, insects, or other pests through at least one air flow opening. Yet another such step involves treating one or more of the side walls 20 or roof sections 32 with an insect repellent.

The embodiments described above are intended to be exemplary. Those skilled in the art will therefore appreciate that the foregoing description is illustrative only, and that various alternate configurations and modifications can be devised without departing from the scope of the appended claims. Accordingly, the present invention is intended to embrace all such alternate configurations, modifications and variances which fall within the scope of the appended claims.

The invention claimed is:

1. A greenhouse, comprising:
one or more upstanding side walls providing a structural frame forming a periphery of the greenhouse and providing structural support for the greenhouse, the one or more side walls defining an enclosed growing area within the greenhouse, each of the one or more side walls comprising a top edge;
a roof extending upward from the structural frame and covering the growing area, the roof having multiple roof sections each extending inwardly from the structural frame and terminating over a portion of the growing area, the multiple roof sections comprising:
a first roof section extending from a lower inward edge spaced laterally inwardly from the structural frame and terminating in a first remote edge disposed over the growing area, the first roof section extending from the lower inward edge spaced inwardly from a first side wall and terminating in the first remote edge;
a second roof section extending inwardly from the top edge of a second side wall opposed to the first side wall, the second roof section terminating in a second remote edge spaced inwardly from the second side wall and disposed over the growing area, wherein the first and second remote edges overlap one another to define a first roof overlap between the first roof section and the second roof section, a first vertical gap being defined between the first and second roof sections at the first roof overlap to define a lower air flow opening permitting air circulation therethrough; and
a third roof section extending inwardly from the top edge of the first side wall and terminating in a third remote edge spaced inwardly from the first side wall, the third remote edge and the second remote edge of the second roof section overlapping one another to define a second roof overlap between the third roof section and the second roof section, a second vertical gap being defined between the third roof section and the second roof section at the second roof overlap to define an upper air flow opening permitting air circulation therethrough;
wherein a continuous air flow channel is formed between the first, second and third roof sections and extends between the upper and lower air flow openings to permit air circulation therebetween; and
a cooling system mounted to at least one of the first, second and third roof sections, the cooling system including nozzles operable to spray water vapour into air circulating within the air flow channel.

2. The greenhouse according to claim 1, wherein each of the first, second and third roof sections is arcuate in shape and extends inwardly in an arc from the structural frame to the first, second and third remote edges respectively.

3. The greenhouse according to claim 2, further comprising an adjustment device adapted to adjust a curvature of at least one of the multiple roof sections.

4. The greenhouse according to claim 1, wherein the nozzles are in fluid connection with a pressurized water supply, the nozzles being mounted and spaced from one another along the remote edge of the second roof section, each of the nozzles being adapted to spray the water vapour into the air circulating within the air flow channel.

5. The greenhouse according to claim 1, wherein the cooling system further comprises a relay operatively connected to the nozzles and adapted to spray the water vapour from each of the nozzles at intermittent time intervals, the time intervals being determined based on at least one parameter selected from the group consisting of: ambient temperature of the greenhouse, relative humidity of the greenhouse, ambient air temperature, solar radiation, supplemental radiation, vapor pressure inside the greenhouse, and wind speed.

6. The greenhouse according to claim 1, further comprising a screened gate spanning at least one of the upper and lower air flow openings, the screened gate being adapted to prevent ingress of pests into the greenhouse.

7. The greenhouse according to claim 1, wherein each of the first, second, and third roof sections are arcuate and extend inwardly in an arc from the structural member to the first, second and third remote edges respectively.

8. The greenhouse according to claim 7, wherein the arc of the third roof section extends above substantially two thirds of a width of the greenhouse.

9. The greenhouse according to claim 1, wherein the nozzles are mounted to the second remote edge, the nozzles being adapted to spray the water vapour into the air flow channel along an upper surface of the first roof section.

10. The greenhouse according to claim 1, wherein the structural frame comprises a support member spaced inwardly from the one or more side walls, the support member having a support member top edge and extending parallel to the first side wall along its length, the first roof section extending inwardly from the support member top edge.

11. The greenhouse according to claim 1, further comprising an upper screened gate for preventing ingress of pests into the greenhouse, the upper screened gate spanning the upper air flow opening and mounted to the second remote edge and the third remote edge.

12. The greenhouse according to claim 11, wherein the upper screened gate is mounted to the second remote edge and adapted to collapse the third roof section onto the second roof section.

13. The greenhouse according to claim 1, wherein at least one of the side walls comprises a screened wall extending along a length of said one or more side walls between a bottom edge and the top edge of said one or more side walls.

14. The greenhouse according to claim 1, wherein at least one of the side walls and roof sections is treated with an insect repellent.

15. The greenhouse according to claim 1, wherein each of the multiple roof sections comprises a plurality of frame members spaced adjacent one another along a length of each of the multiple roof sections.

16. The greenhouse according to claim 15, wherein each of the multiple roof sections further comprises a substantially water-impermeable membrane attached to the frame members so as to form a roof cover.

17. The greenhouse according to claim 1, wherein the top edges of the one or more side walls each have a height, the height of the top edge of a first one of the one or more side walls being greater than the height of the top edge of ap second one of the one or more side walls.

18. The greenhouse according to claim 1, further comprising sensors mounted to at least one of the roof sections, the sensors adapted for measuring parameters selected from the group consisting of: ambient temperature of the greenhouse, relative humidity of the greenhouse, ambient air temperature, solar radiation, supplemental radiation, vapor pressure inside the greenhouse, and wind speed.

* * * * *